United States Patent
Gilbreath et al.

(10) Patent No.: US 6,447,017 B1
(45) Date of Patent: Sep. 10, 2002

(54) FLUID COUPLING AND ASSEMBLY

(75) Inventors: Donald R. Gilbreath; Melvin O. Hendricks, both of Rockford, IL (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/430,155

(22) Filed: Oct. 29, 1999

(51) Int. Cl.$^7$ ................................................ F16J 15/00
(52) U.S. Cl. .................... 285/89; 285/382; 285/256; 285/280; 285/305; 285/321
(58) Field of Search ........................ 285/278, 280, 285/281, 276, 256, 382, 89

(56) References Cited

U.S. PATENT DOCUMENTS

| | | | |
|---|---|---|---|
| 1,436,392 A | | 11/1922 | Ganz |
| 3,380,505 A | * | 4/1968 | Heath .......................... 285/89 |
| 3,799,589 A | | 3/1974 | Boelkins |
| 3,999,781 A | * | 12/1976 | Todd .......................... 285/256 |
| 4,332,402 A | | 6/1982 | Shellhause |
| 4,478,435 A | | 10/1984 | Cheshier et al. |
| 4,625,998 A | | 12/1986 | Draudt et al. |
| 5,094,491 A | | 3/1992 | Berghammer et al. |
| 5,149,148 A | * | 9/1992 | Taeuber, Jr. et al. ........ 285/276 |
| 5,165,734 A | | 11/1992 | Smith |
| 5,201,554 A | | 4/1993 | Gagg et al. |
| 5,280,966 A | * | 1/1994 | Morris et al. ............... 285/89 |
| 5,335,947 A | | 8/1994 | Remsburg |
| 5,374,085 A | | 12/1994 | Beatrice et al. |
| 5,470,114 A | | 11/1995 | Umney et al. |
| 5,490,693 A | | 2/1996 | Ficher et al. |
| 5,662,359 A | | 9/1997 | Kargula |
| 5,707,085 A | | 1/1998 | Kubiak |
| 5,727,821 A | | 3/1998 | Miller |
| 5,735,552 A | * | 4/1998 | Elliot-Moore ............... 285/276 |
| 5,860,677 A | | 1/1999 | Martins et al. |
| 5,871,239 A | | 2/1999 | Boscaljon et al. |
| 6,217,083 B1 | * | 4/2001 | Bravo ......................... 285/276 |

FOREIGN PATENT DOCUMENTS

| | | | | |
|---|---|---|---|---|
| AU | 0294538 | * | 5/1967 | .................. 285/89 |
| CH | 0417249 | * | 1/1967 | ................. 285/276 |
| FR | 1428767 | | 1/1966 | |
| FR | 2363753 | * | 3/1978 | ................. 285/276 |
| GB | 1067286 | | 5/1967 | |
| GB | 1215980 | | 12/1970 | |
| GB | 1562921 | | 3/1980 | |

* cited by examiner

*Primary Examiner*—Lynne H. Browne
*Assistant Examiner*—Aaron Dunwoody
(74) *Attorney, Agent, or Firm*—M. S. Olson, Esq.; C. H. Castleman, Esq.; S. G. Austin, Esq.

(57) ABSTRACT

A coupling comprising a swivel stake nut or other connecting end portion rotatably coupled to a stem portion, and a jam nut or other stabilizing apparatus mounted upon or otherwise attached to one of said connecting end portion and stem portion in stabilizing relation to the other thereof, for inhibiting axial, rocking and/or rotational movement of the components during pressurized operation of the device with impulse cycling when coupled to hose or other fluid transfer component and an associated equipment port, in the absence of a separate adapter.

17 Claims, 5 Drawing Sheets

FLUID COUPLING AND ASSEMBLY

BACKGROUND OF THE INVENTION

The present invention relates to fluid couplings of the swivel variety, and more particularly to such couplings wherein axial, rotational and rocking movement of the component parts is essentially eliminated during cyclic pressurized operation. The invention furthermore relates to such couplings for the connection of a medium or high-pressure hose or line, such as a pneumatic or hydraulic line to a standard equipment port without the need for a separate stabilizing adapter.

Fluid couplings are utilized in a variety of applications and may be utilized to connect line or hose to various types of industrial equipment and machinery via the equipment's hydraulic connection ports or manifolds, or to connect two pieces of equipment to one another, or to connect one piece of such equipment to rigid pipe or tubing. Hydraulic coupling assemblies in particular, which may include a hydraulic hose, and a hydraulic coupling for engagement with an equipment port for example, may be required to perform under a variety of working pressures, any of which may involve a high degree of pressure cycling resulting in sudden dramatic pressure increases, also known as impulses or spikes.

A fluid coupling typically has two ends; one generally defines the hose connection end and the other defines the equipment connection end. The hose connection end is typically characterized by a stem with a series of circumferential flanges or barbs that facilitate engagement to the end of a hose. The equipment connection end is commonly characterized by a male or female configuration with circumferential threads for connection to a complementary configured equipment port.

The two main types of threaded fluid couplings are known as "solid" and "swivel" types. In solid-type coupling assemblies the coupling's equipment connection end and hose connection end are on opposite ends of a single, rigid component, to maintain a very robust and durable solid connection between an equipment port and a second fluid transfer component. However, installation of solid type couplings may be cumbersome or even impossible in some environments. Since the solid type coupling's equipment connection end and hose connection end are on opposite ends of a single, rigid component, and one end cannot therefore rotate, or "swivel" relative to the other, the coupling and the hose to which it is attached must be rotated as a unit in threading the coupling onto the associated equipment port. Alternatively, a separate swivel adapter may be utilized to facilitate assembly without the need for rotating any portion of the components, but the utilization of a separate component, i.e., the swivel adapter, adds costs to the assembly in terms of labor, storage, maintenance, etc.

For the second type of coupling, i.e., swivel-type couplings, the equipment connection end and the hose connection end still define opposite ends of the device, but they are housed in separate rigid components which are connected to one another in such a way as to allow independent rotation of one component in relation to the other, thus allowing the hose to remain stationary as the coupling is threaded onto an associated equipment port. The equipment connection end is housed in a first component such as a swivel nut or a push-to-connect adapter, which may be staked or otherwise conventionally rotatably attached to a second component which houses the hose connection end. In the interest of clarity, the term "connecting end portion" will be utilized throughout this disclosure to denote that component housing the coupling's equipment connection end, and the term "stem portion" will be utilized to denote that component housing the coupling's second connection end, or hose connection end. While they provide this installation benefit, swivel-type couplings historically have not performed as well as solid couplings under cyclic pressurized or impulse conditions. The present invention is directed to an improvement in the second type of couplings, i.e., in swivel-type couplings.

Swivel-type couplings are generally of two main types. In the first, a swivel coupling, comprising a stem portion rotatably coupled to one end of a swivel nut, is connected at the swivel nut's second, female-configured end to a male-configured adapter previously-installed into an equipment port. Once installation is complete, the adapter between the equipment port and the swivel nut prevents further rotation of the swivel nut vis-a-vis the stem portion. The stabilizing adapter has an annular face designed to abut a complementary annular face on the stem portion when all three components, i.e., stem portion, swivel nut and stabilizing adapter, are in their final position, thereby inhibiting further relative movement between the stem portion and swivel nut. While providing improved ease of installation compared to solid-type couplings, this type of swivel coupling also requires a separate component, i.e., the stabilizing adapter, which adds to the total cost of the device in terms of production, storage, labor and installation time.

In the second type of swivel coupling device, the connecting end portion is threaded directly into an equipment port in the absence of a separate adapter. This device presents a lower cost alternative to the first type of swivel coupling device. Unlike the first type of swivel coupling device however, once installation is complete, the connecting end portion and stem portion remain free to rotate independently of each other. While in some applications this independent rotation of the respective ends of the coupling device is acceptable, in others, it is unacceptable.

In particular, an elastomeric member is used to seal the connection between the connecting end portion and the stem portion in this second type of swivel coupling device. The traditional design of the swivel feature is characterized by some degree of slack between the connecting end portion and the stem portion of the coupling assembly. This slack permits undesirable relative movement of the swivel coupling's stem portion vis-a-vis the equipment port during installation and particularly during pressure impulse operation. This movement gradually wears away or causes "nibbling" of the elastomeric element, which can lead to a premature leak path in the system. This invention is directed toward eliminating or inhibiting this relative movement in swivel couplings of this type during pressure impulses, thus increasing the expected operating life of such couplings, and potentially allowing for their utilization in high pressure environments heretofore unavailable for swivel couplings of this type.

SUMMARY OF THE INVENTION

Accordingly, a fluid coupling is provided, comprising a connecting end portion, preferably in the form of a swivel nut, having a first end defining an equipment connection end for connection of the coupling to an associated equipment port, and a second end for connection to a stem portion. The stem portion has a first end for connection to the connecting end portion, and a second end defining a second coupling connection end or hose connection end for connection of the coupling to a hose or other component. The stem portion is preferably rotatably coupled to the connecting end portion via any suitable swivel means. The coupling further comprises a stabilizing apparatus for stabilizing the connection between the connecting end portion and the stem portion upon pressurized operation thereof. The stabilizing apparatus may be threaded or otherwise connected onto or integral with one of the connecting end portion or the stem portion, at a point other than at the connecting end portion's equipment connection end, in stabilizing relation to the other in such a manner as to substantially inhibit relative axial, rocking and/or rotational movement between the connecting end portion and the stem portion under pressurized conditions. The stabilizing apparatus is preferably in the form of a jam nut, a latching-type collar mechanism, or combinations thereof.

In a further embodiment, a swivel coupling stem portion assembly is provided, comprising the stem portion described above, adapted for engagement to a connecting end portion, and further comprising a jam nut or other stabilizing apparatus as set forth above. In yet another embodiment, a hydraulic coupling and hydraulic coupling assembly are provided, the assembly comprising the coupling described above in the form of a hydraulic coupling, which is connected at its equipment connection end to an equipment port, and at the hose connection end of its stem portion, to a hydraulic hose. A method for stabilizing such swivel couplings is moreover provided.

BRIEF DESCRIPTION OF THE DRAWINGS

The accompanying drawings, which are incorporated in and form a part of the present specification, illustrate preferred embodiments of the invention, and together with a description, serve to explain the principles of the invention. In the drawings, like numbers denote like parts, and.

DETAILED DESCRIPTION

Figure 2:
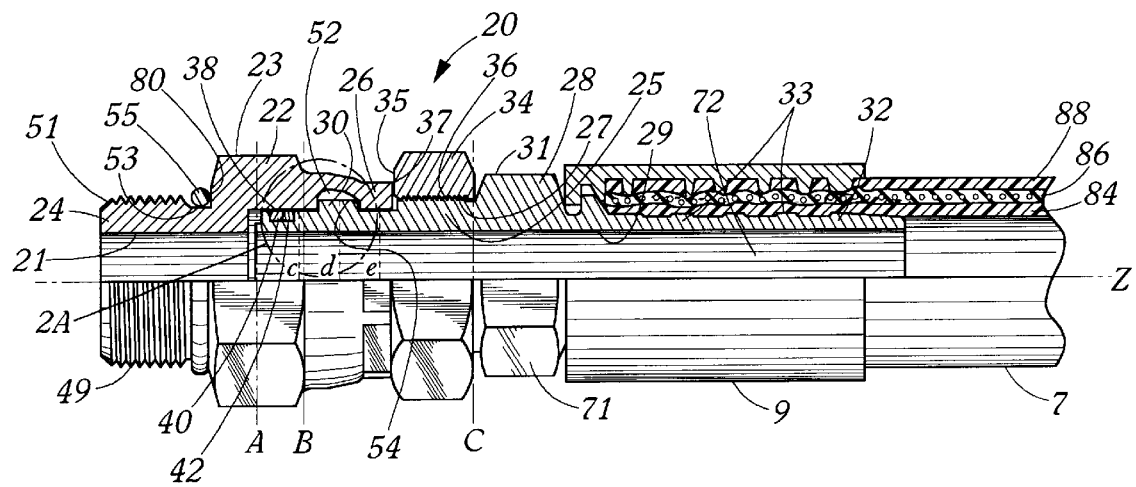
FIG. 2 is a partially exploded side view, with top half shown in cross-section, of a hydraulic coupling assembly constructed in accordance with one embodiment of the present invention.
Figure 2A:
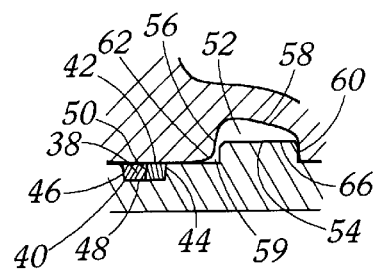
FIG. 2A is an enlarged, cross-sectional, detail view, of that portion of the coupling shown within the hashed-line circle in FIG. 2.
Figure 2B:
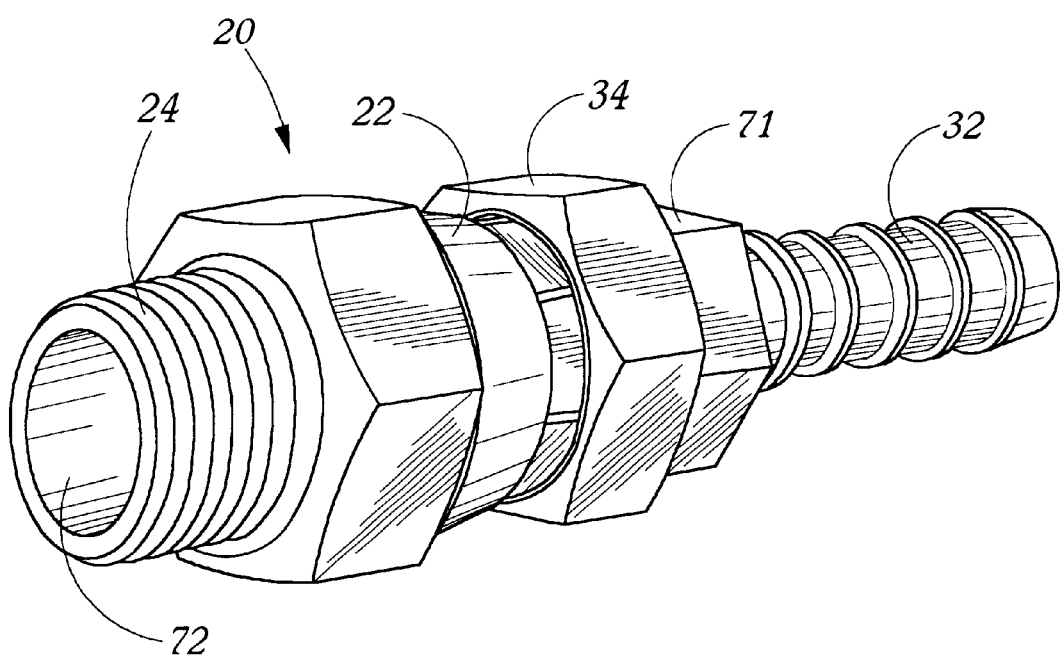
FIG. 2B is a perspective view of the coupling shown in FIG. 2.

Referring to FIGS. 2 and 2B, an embodiment of the present invention in the form of a fluid coupling assembly is shown generally. The coupling 20 of the assembly includes a first substantially rigid component defining a connecting end portion 22, which may be of any suitable form adapted to engage an equipment port or other fluid transfer component, including that of a swivel nut or swivel stake nut, a push-to-connect adapter or a clip fastener fitting, but is shown in FIGS. 2 and 2B as being in the form of a swivel stake nut, or swivel nut. The connecting end portion 22, here as shown in the form of a swivel nut, possesses an inner surface 21 and an outer surface 23, a first end defining an equipment connection end 24 for connection to an associated equipment port (not shown) which may be of any conventional type, and a second end 26.

In the preferred embodiment shown, the coupling 20 further comprises a second substantially rigid component defining a stem portion 28, having an inner surface 29, an outer surface 31, and having a first end 30 rotatably coupled or latched to the connecting end portion 22 at the connecting end portion's second end 26. The stem portion 28 also possesses a second end defining the coupling device's second connection- or hose connection end 32, which in the embodiment shown is formed for connection to associated hose 7. While in the embodiment shown, the stem portion's second end defines the connection point of the coupling to a hose end, it should be readily apparent that this second end could likewise be modified according to conventional designs for connection to other types of components, e.g., rigid pipe or tubing, a second equipment port, etc. without departing from the scope of the present invention as set forth in the appended claims.

When properly assembled, at least a portion of the inner surfaces 21, 29 of the connecting end portion 22 and the stem portion 28 respectively, form a fluid passage cavity 72 or bore for conveying pressurized medium between the hose or other component and the associated piece of equipment.

The connecting end portion 22 and the stem portion 28 are movable toward and away from one another during assembly along a longitudinal axis Z. At least one of the stem portion 28 and connecting end portion 22 are moreover preferably movable toward and away from a collar 54 during assembly, the collar having a surface 66 for engaging one or more grooves in at least one of the stem portion 28 and connecting end portion 22, and, once in that engaged position, retaining the stem portion 28 in a generally fixed longitudinal position relative the connecting end portion 22.

In a preferred embodiment as shown in FIG. 2, the connection between the stem portion 28 and the connecting end portion 22 which in this case is in the form of a swivel nut is via a latch mechanism between the components generally at the stem portion's first end 30 and the connecting end portion's second end 26. In this embodiment, the collar 54 is integral with the stem portion 28, and engages the groove 52 in the connecting end portion 22. Many alternative mechanisms for connecting a connecting end portion 22 to a stem portion 28 are well known to the art and could be utilized successfully in the practice of the present invention, including for example, staking or rolling one component onto the other resulting in a deformation-type joint or connection; wire-on nuts wherein a wire is threaded through a groove in the nut to hold it in place; retaining ring connections including those utilized in so-called push-to-connect or snap-to-connect devices; un-deformed or solid-back joints wherein a latch is accomplished between a swivel nut and the stem portion without deformation of a collar or projection at the connection interface, and staple joints or clip fasteners. The presently preferred latch mechanism for use in the practice of the present invention, which is a deformation type as shown in FIGS. 2 and 2A, and which contributes to the stabilization of the connection between the connecting end portion 22 and the stem portion 28, is described in further detail below.

The coupling furthermore includes a stabilizing apparatus, shown in the preferred embodiment of FIG. 2 as comprising a lock nut or jam nut 34, which stabilizes or solidifies the connection between the connecting end portion 22 and the stem portion 28 once assembly and installation of the hydraulic coupling 20 onto an associated equipment port is complete. The jam nut 34 may be of any conventional form whereby relative movement of the connecting end portion 22 in relation to the stem portion 28 is substantially restricted by its presence in its final tightened position in the device. Thus for example as shown in FIG. 2, the jam nut 34 may preferably be in the form of a generally conventional nut for threading engagement with the piece to which it is to be attached. According to this same preferred embodiment, the jam nut 34 may also possess an outer surface having a generally hexagonal configuration, i.e., it may be in the form of a hexagonal or "hex" nut as shown, to facilitate mounting and threading of the jam nut onto the device utilizing conventional tools, e.g., a simple hand wrench. The jam nut may however possess any suitable configuration to accomplish the intended result, including having a square, round or any other appropriately shaped outer surface. As one skilled in the art would readily recognize, a jam nut may be slightly shorter along the axis Z than an otherwise similarly-dimensioned conventional hex nut. Suitable dimensions of a jam nut for a given coupling of the present invention could be readily determined by one skilled in the art. Care should be taken that sufficient engagement of threads or other connection means is achieved in order to ensure a durable, solid connection. Conversely, the jam nut should not be designed to be so long along the axis Z as to result in unacceptable stress in the latch area, as further described below.

As noted above, the coupling of the present invention forms a sealed connection for conveying pressurized medium from one component to another. The device thus preferably includes sealing means, preferably in the form of one or more, suitable flexible annular washers or rings, such as the o-ring 38 as shown, which forms an elastomeric seal between the connecting end portion 22 and the stem portion 28 when the pieces are properly joined together. This internal o-ring 38 may be formed of any suitable flexible material compatible with the underlying materials and with the materials to be conveyed through the system, but is preferably formed of an elastomeric material. The o-ring or equivalent elastomeric sealing means may be located between the connecting end portion 22 and stem portion 28 in any conventional manner. A preferred configuration as shown in FIG. 2 however is described more fully below.

In a preferred embodiment of the present invention as shown in the FIGS. 2 and 2A, the sealing means further comprises at least a second ring in the form of an annular washer or back-up ring 42. This back-up ring 42 is preferably situated between the connecting end portion 22 and the stem portion 28, in essentially abutting relation to the internal o-ring 38, more preferably on the side of the o-ring 38 nearest the hose connection end 32 of the stem portion 28, i.e., opposite the pressurized side of the o-ring 38, to inhibit extrusion of the o-ring material through the device during pressurized operation. The back-up ring 42 may be formed of any material suitably chemical resistant for a given application, and is preferably formed of suitable fluorinated polymers including those made available by DuPont Chemical Co. under the trademark, TEFLON.

The unique design of the multi-component coupling 20 of the present invention in the preferred embodiment illustrated in FIG. 2 incorporates a number of functional areas, each of which contains preferred design elements. In the interest of clarity, two of these functional areas will be described hereinafter as "the seal portion", and "the latch portion". The seal portion extends from point A to point B as shown in FIG. 2, and preferably includes a preferred geometry which hereinafter will be referred to as the "seal geometry" A-B. The latch portion extends from point B to point C as shown in FIG. 2, and is characterized by a preferred geometry which hereinafter will be referred to as the "latch geometry" B-C.

The latch geometry B-C of the coupling 20 of this preferred embodiment of the present invention incorporates the mechanism whereby the stem portion 28 is latched or coupled to the connecting end portion 22, here in the form of a swivel nut. It also incorporates the mechanism whereby the rotational movement, or swivel, of the stem portion 28 vis-a-vis the connecting end portion 22 is provided, for purposes of simplified installation of the coupling 20. It furthermore preferably includes the stabilization mechanism whereby axial and/or rocking movement of the individual assembly components in relation to one another is significantly reduced compared to conventional designs during installation, and whereby virtually all relative movement of the components, e.g., axial, rocking and rotational, is substantially reduced or even essentially eliminated during pressurized operation of the assembly.

With respect to the stabilizing function of the latch geometry B-C and according to an aspect of the preferred embodiment shown in FIG. 2, between it's first end 30 and hose connection end 32 and on its outer surface 31, the stem portion 28 includes a central region 25 which includes one or more external threads 27, or other conventional connection means well known to the art. The jam nut 34 preferably includes internal threads 36 corresponding or complementary to the external threads 27 of the stem portion's central region 25. The jam nut 34 may thus be threaded onto the central region 25 of the stem portion 28. The device 20 is formed so that, when properly assembled, the leading face 35 of the jam nut 34 substantially abuts an opposing face 37 on the connecting end portion 22. That is, as the jam nut 34 is threaded onto the outer surface 31 of the stem portion 28 in the direction of the connecting end portion 22, it increasingly forces complementary faces 35, 37 on the jam nut 34 and the connecting end portion 22 respectively into abutting relation, thus forming a solid, i.e., essentially static connection between the stem portion 28 and the connecting end portion 22. One skilled in the relevant art would readily recognize that the components could likewise be modified so that the jam nut is threaded onto the connecting end portion in stabilizing relation to the stem portion, without departing from the scope of the present invention as set forth in the appended claims.

While the use of a jam nut in the manner here described is presently preferred in the practice of the invention, any stabilizing apparatus which could be mounted upon or otherwise attached to or located within the device at a point other than at the connecting end portion's equipment connection end, in such a way as to substantially reduce or eliminate the relative movement between the stem portion 28 and the connecting end portion 22 to stabilize the coupling in the absence of a separate stabilizing adapter may be used and are contemplated as falling within the scope of the present invention. Such means may include for example, a jam nut for urging together a taper seat between the components, a jam nut having a lock-type washer (including bevel, star, and keyed types), set screws, and tapered clamps. Moreover, irrespective of the particular stabilizing apparatus or connecting end portion utilized in the practice of the present invention, the stem portion and jam nut or alternative stabilizing apparatus may form a stem portion assembly which may be adapted or formed to engage and stabilize virtually any suitable connecting end portion, whether integral with or distinct from the equipment port, without departing from the present invention as set forth in the appended claims. The relationship and function between such stem portion and stabilizing apparatus in relation to the particular connecting end portion would be in all relevant respects the same as set forth above for the description of FIG. 2. That is, to form the stem portion assembly of the present invention, the stabilizing apparatus may preferably be threaded onto the outer surface of the stem portion, or otherwise attached to or mounted within or upon the stem portion, in such a way as to stabilize the connection to the connecting end portion to which the stem portion is to be coupled.

Turning now to the connection between the connecting end portion 22 and the stem portion 28, and as can be seen in the preferred embodiment of the invention shown in FIGS. 2 and 2A, the inner surface 21 of the connecting end portion 22 which in this case is in the form of a swivel nut, in the area incorporating the latch portion (B-C) includes an annular groove 52 generally comprising three walls 56, 58, 60. Two of the walls 56, 60 are generally laterally opposed to one another, and the third wall 58, is generally transverse or perpendicular to the direction of the others. As shown, the third wall 58 possesses a slightly curvilinear profile. This is shown to suggest the deformation thereof which is an intended result of the staking operation between the stem portion 28 and swivel stake nut 22 in this particular preferred embodiment of the present invention. One skilled in the relevant art would readily recognize that the particular curvilinear profile shown is not necessary to the operation of the claimed device, but is shown to suggest a particular preferred embodiment of the invention wherein the latching mechanism consists of staking the swivel nut 22 onto the stem portion 28.

According to a preferred embodiment and as shown in FIGS. 2 and 2A, the outer surface 31 of the stem portion 28 includes an annular collar 54 in the form of a ridge or projection. The swivel nut's annular groove 52 is designed to engage the collar 54 such that the stem portion's collar 54 is sandwiched or contained within the three walls 56, 58, 60 defining the swivel nut's groove 52. This design substantially impedes relative axial movement of the components, particularly between the stem portion 28 and swivel nut, during installation, which in turn reduces wear of the internal o-ring 38. Thus, in addition to providing the connection or latch mechanism for the device, the annular collar 54 defines additional stabilizing apparatus for stabilizing the connection between the stem portion 28 and the connecting end portion 22.

Figure 1:
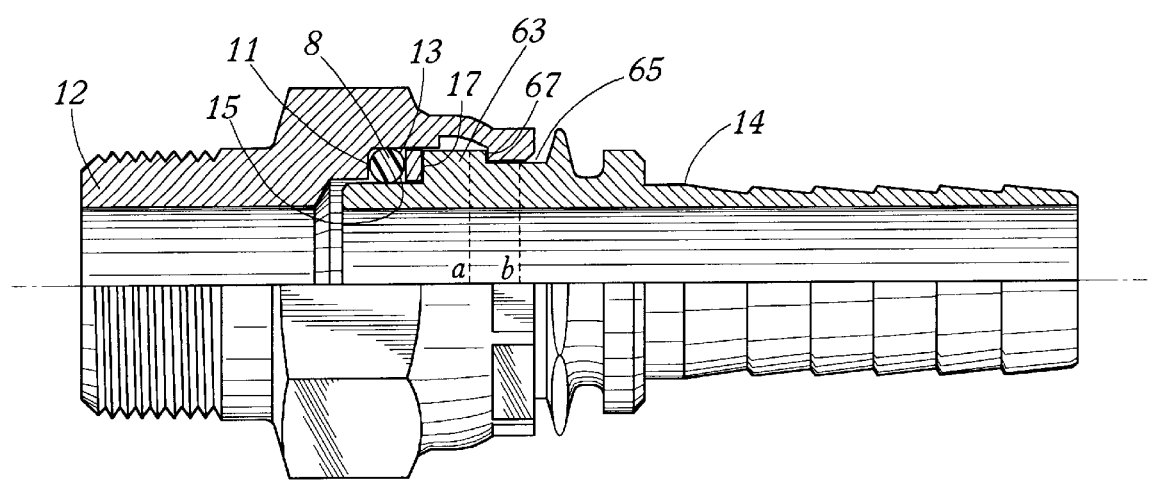
FIG. 1 is a side view, with top half shown in cross-section, of a swivel-type hydraulic coupling of the prior art.

In conventional latching mechanisms, as shown for example in FIG. 1, while the stem portion 14 incorporates a ridge 63 and groove 65 configuration, the stem portion 14 has a relatively constant diameter a from the ridge 63 adjacent the o-ring 8 to its connection or engagement surface 67 with the swivel nut 12, and the groove 65 is recessed therefrom, to form a new diameter b. Conversely, according the preferred embodiment of the present invention, the collar 54 on the stem portion 28 possesses a surface which projects radially outward, i.e., is stepped-out from the balance of the stem portion's outer diameter. That is, the stem portion 28 preferably has at least three distinct outer diameters c, d, e, in the latch region B-C and the largest d of the three is located between the other two c, e to form the collar 54, and the connecting end portion's groove 52 generally attaches about its entirety. Alternatively, the outer diameters c, e may be equivalent to one another, and the greater diameter d may be located between diameters c,e to form the projection or collar 54.

As can be seen in FIG. 2, and as one of ordinary skill in the art would readily recognize, this configuration makes it possible to utilize an o-ring having a diameter smaller than heretofore possible in devices of the prior art designed for similar applications. The stem thickness in the latch area is conversely increased compared to conventional couplings designed for similar applications. This combination of features results in decreased stress in the latch area, thus it is believed that the hydraulic coupling of this preferred embodiment performs under higher pressures and greater cyclic impulse than a conventional model coupling designed for a similar working environment. Moreover, this more robust stem portion thickness facilitates the utilization of a jam nut as described above on the assembly. In couplings having less robust component thicknesses, the utilization of a jam nut in the manner here described may not in all cases be practicable due to the relatively high force it would exert on the balance of the components.

As one skilled in the art will readily recognize, the profiles of the respective pertinent surfaces of the stem portion 28 and swivel nut 22 may be modified in this latch area and achieve this same preferred result, provided that three boundary walls of the groove 52 containing the collar 54, are on one of either the stem portion or the connecting end portion and the robustness of the component bearing the jam nut, if utilized, remains generally adequate.

As one skilled in the relevant art will readily appreciate and as suggested in the preferred embodiment shown in FIG. 2, in order to allow for independent rotation of the components, or swivel, on installation of the device, the stem portion's annular collar 54 does not entirely fill the space formed by the swivel nut's annular groove 52 for the particular embodiment shown. Rather, the distance between the opposing walls 56, 60 of the swivel nut's annular groove 52 is slightly greater than the length of the collar 54, thus creating a small clearance gap 59 upon tightening of the jam nut 34. This design allows for the "swivel", or rotation of the stem portion 28 in relation to the swivel nut 22, as these pieces are threaded onto an associated equipment port. Any suitable and/or conventional swivel or rotatable connection means may alternatively be employed however in the practice of the present invention.

The connecting end portion, here in the form of a swivel nut 22 moreover preferably includes a slight chamfer 62 on its inner surface 21 adjacent the groove 52 which forms a functional ramp for facilitating insertion of the stem portion 28 into the swivel nut 22 without the risk of cutting into or otherwise damaging the internal o-ring 38 and/or back-up ring 42 or similar sealing member during assembly of the coupling. As with the clearance gap 59 described above, the appropriate dimensions of a chamfer properly designed for such purpose would likely vary with the size of the components and the intended application, but could be readily determined by one skilled in the art.

It should be readily apparent to one of skill in the art that the preferred collar 54 and groove 52 latch configuration described above can be incorporated in a coupling device in the absence of the aforementioned jam nut with good result in certain environments, e.g., where relatively low pressures or pressure impulse are expected and/or where live swivel risk is low. Under such circumstances, this preferred latch mechanism will serve as adequate stabilizing apparatus for the assembly in the absence of a jam nut or other additional stabilizing apparatus.

Turning now to the preferred seal geometry, in a preferred embodiment, the seal geometry A-B of the coupling 20 includes the elastomeric seal between the stem portion 28 and the swivel nut 22. As can be seen in FIG. 2, the outer surface 31 of the stem portion 28 at its first end 30 includes an annular gland 40 for containing the elastomeric sealing member such as the internal o-ring 38 and back-up ring 42, if present. The inner surface 21 of the swivel nut 22 in the area above and on either side of the stem portion's gland 40 when the two components are properly joined, is preferably substantially flat, i.e., contains no significant projections or indentations. Thus, when the device is properly assembled, the o-ring 38 is contained within an annular aperture having four boundaries or walls 44, 46, 48, 50. In the preferred embodiment shown, three 44, 46, 48 of the four walls containing the o-ring 38 are located on one component (here, the stem portion 28), and only one 50 of the four walls is on the opposite component (here, the swivel nut 22). This geometry thus forms an annular aperture in the coupling which has minimal clearance and generally constant dimensions to contain the o-ring 38 or similar sealing means in a fixed area within the device 20. This feature further limits the rocking type movement of the stem portion 28 in relation to the swivel nut 22 during pressurized operation of the coupling, thereby further reducing sealing member wear via the "nibbling" phenomenon described above.

Moreover, by placing the internal o-ring 38 within an aperture in which the two laterally opposed walls 44, 46 are on the same component, i.e., on one of either the stem portion 28 or the connecting end portion 22, the potential for wear of the o-ring 38 via repeated compression thereof is substantially reduced. This phenomenon is more fully apparent by comparison to conventional configurations, as shown, for example in FIG. 1, wherein only two walls 15, 17 containing the device's internal o-ring 8 are located on the stem portion 14, and two walls 11, 13 are on the swivel nut 12, and critically, the laterally opposed walls 11, 17 on either side of the o-ring 8 are on different components, i.e., one on the nut 12 and one on the stem portion 14. Upon operation of the device, the two components, i.e., stem portion 14 and swivel nut 12, are typically moved forcefully apart and then together again under pressure cycling, thus subjecting the o-ring 8 to repeated compression between the laterally opposed walls 11, 17. Conversely, according to a preferred embodiment of the present invention, the internal o-ring 38 is maintained within an aperture having fixed lateral dimensions. The potential for repeated compression of the internal o-ring 38 and concomitant wear thereof is thus substantially reduced.

As one skilled in the art will readily recognize, the profiles of the respective pertinent surfaces of the stem portion 28 and swivel nut 22 may be modified in this area to obtain this same result without departing from this particular aspect of this embodiment of the present invention, provided that three boundary walls containing the internal o-ring are on one of either the stem portion 28 or the swivel nut 22. Moreover, while the embodiment of the invention shown in FIG. 2 includes a stem portion 28 having a male connection configuration for engagement to the second end 26 of the swivel nut 22, which in this embodiment possesses a complementary female configuration in the pertinent connection area, it should be readily apparent that one could alter these configurations so that, for example, the swivel nut's second end possesses a male configuration and the stem portion possesses a complementary female configuration.

Having now set forth a description for the preferred relationship between the components of a preferred embodiment of the invention, i.e., connecting end portion 22, stem portion 28 and jam nut 34, a general description will now be provided for those aspects of the inventive device which may be drawn from conventional coupling design. First, with respect to further connection of the coupling 20 of the present invention to a second fluid transfer component, the second coupling connection end 32 of the stem portion 28 may be coupled to hose 7 or other component, e.g., a second equipment port, rigid pipe or tubing, etc., via conventional connection means well known to the art. With respect to connection to hydraulic or other high- or medium pressure-rated hose, such connection means include but are not limited to the use of annular flanges or barbs 33 located on the outer surface 31 of the stem portion 28 at the second- or, in this case, the hose connection end 32, as shown in FIGS. 2 and 2B, which engage the inner surface of hose 7 to form a connection. This connection may moreover include any suitable annular clamp or ferrule 9, which may be adapted and formed, such as by crimping, as shown, or otherwise treated to form a tight mechanical seal between the components. The hose connection end 32 need not include such barb 33, but may alternatively possess a substantially smooth outer surface.

Second, with respect to connection of the coupling of the present invention at the end opposite the hose connection end, i.e., at its equipment connection end 24, it should be noted that the means used to connect a coupling to an equipment port depends in general on the demands of the particular application. Sealed connection of the equipment connection end 24 of the connecting end portion 22 to an equipment port according to the present invention may be via any suitable and/or conventional connection means including a metal-to-metal thread interface, a metal-to-metal seat fit, an o-ring elastomeric seal, a clip-fastened connection or combinations of the foregoing. In a preferred embodiment, the connecting end portion's equipment connection end 24, which in the preferred embodiment of FIGS. 2 and 2B possesses a male configuration for engagement with a complementary female-configured connection port, includes external threads 49, an angled terminal end 51, an external annular o-ring groove 53 and utilizes an additional o-ring 55 to effect an elastomeric seal with the associated equipment port, in combination with a threaded interface connection. The threaded interface performs the function of maintaining the connecting end portion o-ring face 80 in contact with the equipment port face to prevent extrusion of the external o-ring material. The utilization of this second o-ring 55 (or "external o-ring") to form an elastomeric seal between the coupling's equipment connection end and the associated equipment port is desirable in many applications. It substantially reduces the possibility of leak path formation in metal-to-metal fittings which otherwise generally occurs when an element of the complementary interfacial region is improperly or poorly machined, or is damaged in manufacture or use.

The equipment connection end of the first fitting may however have any suitable profile, including but not limited to a boss type with straight threads, such as those described as SAE J1926, ISO 1179 and ISO 6149; a tapered pipe thread type such as SAE J476 and BS 21; clip fastener fittings such as SAE J1467, etc.

Figure 3:
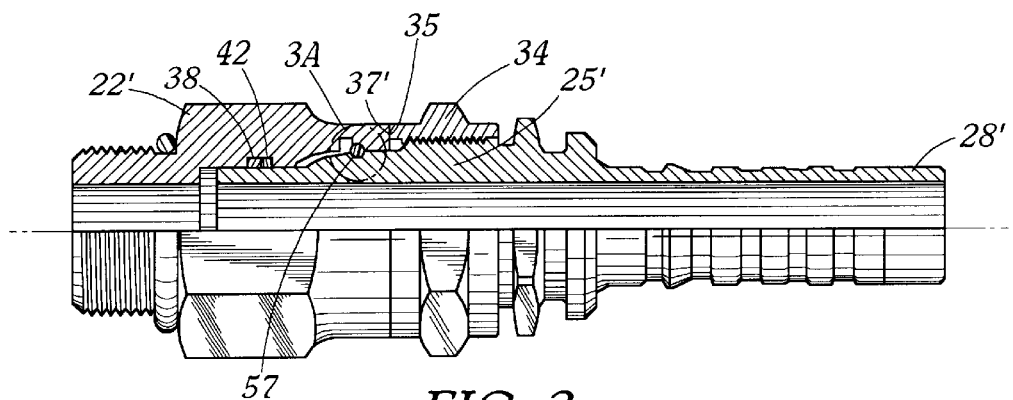
FIG. 3 is a side view, with top half shown in cross-section, of a hydraulic coupling constructed in accordance with another embodiment of the present invention.

Referring to FIG. 3, a second preferred embodiment of the present invention, in the form of a push-to-connect- or quick-connect coupling is shown. Such coupling similarly preferably comprises a stem portion sub-assembly, i.e., a stem portion 28' and the utilization of a jam nut 34 to stabilize a connection, but in this case the connecting end portion 22' is in the form of a push-to-connect adapter. The relationship and function between the stem portion 28' and jam nut 34 in relation to the connecting end portion is in all relevant respects the same as set forth above for the description of FIG. 2. That is, the jam nut 34 is threaded onto the central region 25' of the stem portion 28' in such a way as to stabilize its connection to the connecting end portion to which the stem portion 28' is coupled. The leading face 35 of the jam nut 34 abuts an opposing face 37' on the connecting end portion 22', which in this case is in the form of a push-to-connect adapter, to prevent relative motion between the two components 22', 28' upon installation and pressurized operation characterized by cyclic impulse.

As was the case in the embodiment of the invention shown in FIG. 2, the latch mechanism between the push-to-connect adapter 22' and the stem portion 28' preferably involves engagement of the components by means of a collar and groove. In the particular embodiment shown, the collar is in the form of a suitable connecting ring or retaining ring 57 which may be of any suitable and/or conventional type and which, for purposes of assembly, may initially be housed in either the stem portion 28' or the push-to-connect adapter 22'. As known in the art, the retaining ring 57 may possess a generally annular configuration interrupted at one point such that opposing ends (not shown, but conventional) of the ring are in generally abutting relation to one another to form a generally split ring. Upon assembly of the device and under the insertion impact of one component 28' into the other 22', the retaining ring 57 first compresses or expands as the case may be by virtue of its split configuration, into a first radially aligned groove 61 in the component in which it is initially housed. Once insertion of the components is complete and the retaining ring 57 is positioned both within the first radially aligned groove 61 and also within a second, complementary radially aligned groove 64 in the opposite component, the retaining ring 57 would relaxes to its final configuration to lock in place, thereby maintaining the components 22', 28' within a generally stable longitudinal position with respect to one another. The particular embodiment shown in FIG. 3 is designed so that once locked in place, the connecting- or retaining ring 57 prevents subsequent disconnection between the push-to-connect adapter 22' and the stem portion 28' to form an essentially permanent connection.

Notably, the retaining ring 57 would performs a function essentially equivalent to that of the integral collar 54 in the swivel stake nut assembly described above for FIG. 2. That is, both the integral collar 54 and the retaining ring 57 serve to establish the connection between the connecting end portion 22, 22' and the stem portion 28, 28', by engaging a groove in at least one of the components. It should be apparent from a view of the drawings however, that unlike the latch geometry of the embodiment shown in FIG. 2, the corresponding structure of the embodiment shown in FIG. 3 will not prevent axial movement of the connecting end portion in relation to the stem portion prior to tightening of the jam nut.

Figure 3A:
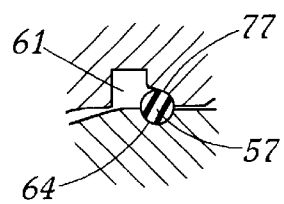
FIG. 3A is an enlarged, cross-sectional, detail view of that portion of the coupling shown within the hashed-line circle in FIG. 3.

As shown in the preferred embodiment of FIGS. 3 and 3A, an annular ridge or step 77 is preferably included in the profile of the groove 61, which urges the retaining ring 57 into proper position within the groove 64 as the jam nut 34 is tightened against the adapter 22'. The ridge 77 moreover prevents the ring 57 from moving out of its final position and disengaging when increased pressure or torque is applied.

As in the embodiment of FIG. 2, sealing between the components 22', 28' is preferably provided by an internal o-ring 38, more preferably in combination with a back-up washer or ring 42 seated adjacent the o-ring 38 on the non-pressurized side thereof. While the embodiment shown in FIG. 3 does not indicate the preferred o-ring gland configuration set forth in the discussion of FIG. 2, it should be readily apparent that such gland could equally well be utilized in the device of FIG. 3.

Figure 4:
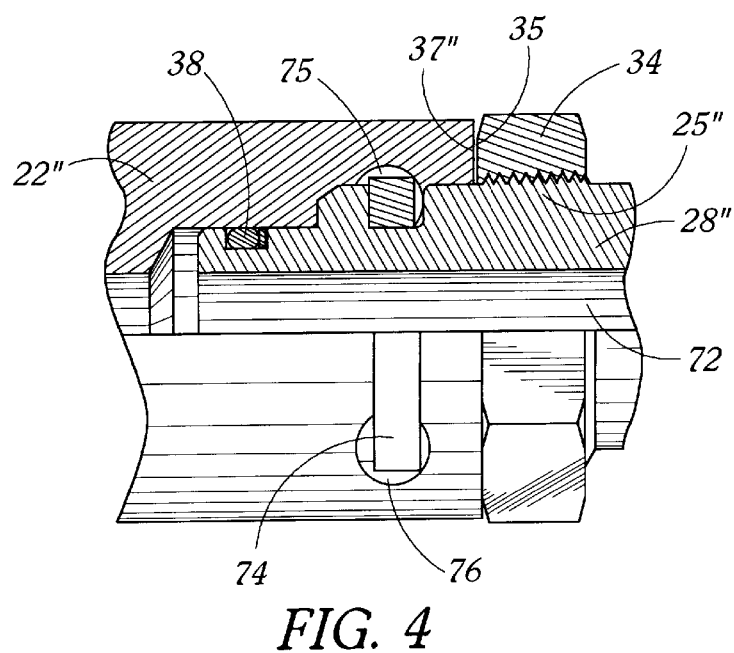
FIG. 4 is a side view, with top half shown in cross-section, of a hydraulic coupling constructed in accordance with another embodiment of the present invention.

Referring now to FIG. 4, a third preferred embodiment of the present invention is shown generally. The figure illustrates a clip-fastener type system such as set forth for example in SAE J1467. Such systems typically comprise a connection whereby a staple 74 is inserted through two apertures 75, 76 in the device which run transverse to the direction of flow of the conveyed fluid, to connect the connecting end portion 22" (which, in this case is in the form of a clip-fastener adapter which may be integral with or mounted upon the equipment port as is well known in the art), and the stem portion 28". The incorporation of a stabilizing apparatus in the form of a jam nut 34 within this configuration will be substantially the same as described above for FIGS. 2 and 3. That is, the jam nut 34 may be threaded onto the central region 25" of the stem portion 28" to form a stem portion subassembly. In its final position on the coupling, the leading face 35 of the jam nut 34 will abut an opposing face 37" on the connecting end portion 22" (i.e., the clip fastener adapter), to prevent relative motion between the two fittings 22", 28" upon installation and pressurized operation of the device. As in previously described embodiments of the invention, an elastomeric o-ring 38 or other suitable sealing means may preferably provide the seal between the components 22", 28".

Figure 5:
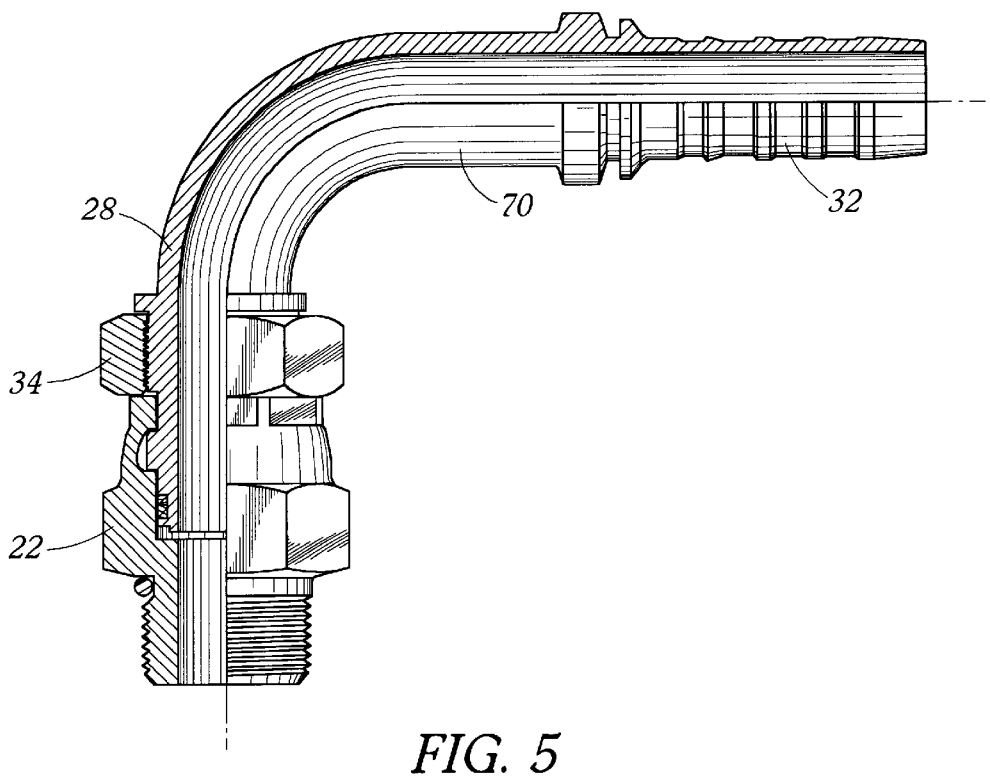
FIG. 5 is a side view, with half shown in cross-section, of a hydraulic coupling constructed in accordance with another embodiment of the present invention.
Figure 6:
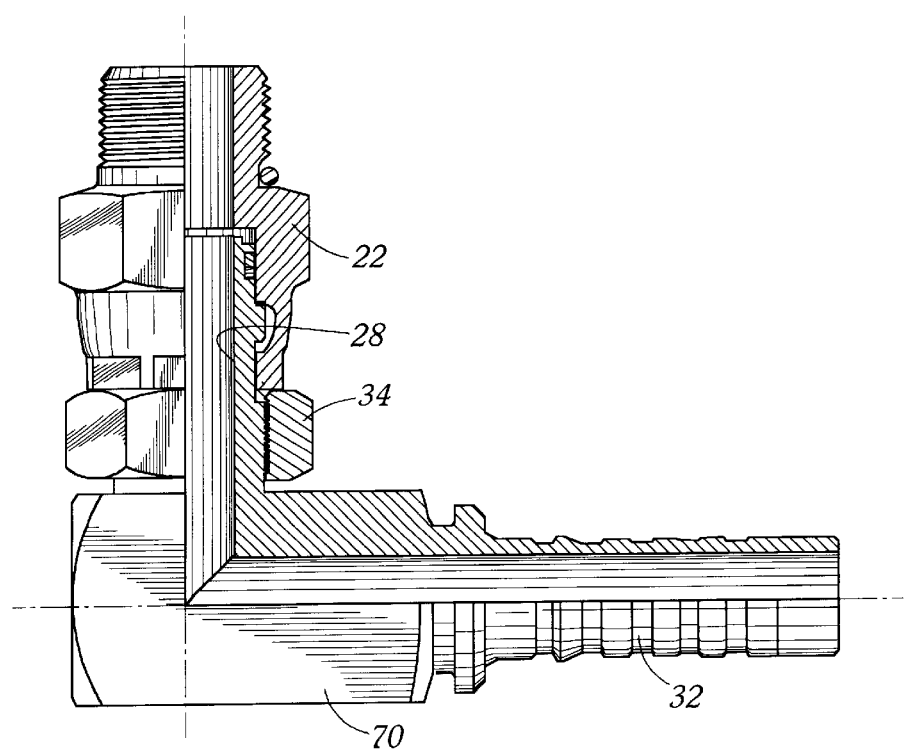
FIG. 6 is a side view, with half shown in cross-section, of a hydraulic coupling constructed in accordance with another embodiment of the present invention.

The fluid coupling of the present invention may be of any conventional configuration well known to the art, including a straight-type connection as shown in FIG. 2, that of an angled connection, as shown for example in FIG. 5, or a block-type angled connection, as shown for example in FIG. 6. In these figures, as well in part for FIGS. 3 and 4, it should be readily apparent that for the sake of clarity, only those parts which are relevant to a discussion of the relationship of the connecting end portion to the stem portion, and the configuration thereof, are numbered.

While not necessary in the practice of the present invention, in straight-configured fluid couplings as shown in FIG. 2, the incorporation of a wrenching surface 71, preferably in the form of a hexagonal surface 71 as shown, or equivalent installation aide on the outer surface 31 of the stem portion 28 adjacent the jam nut 34 and generally in abutting relation thereto has been found advantageous during tightening of the jam nut 34 onto the balance of the assembly. In the absence of such wrenching surface 71, tightening the jam nut 34 onto the connecting end portion 22 may cause the stem portion 28 and hose subassembly to slip vis-a-vis the connecting end portion 22. This could introduce an undesirable twist to the hose to which the device is attached. As shown in FIGS. 5 and 6 respectively, in angle- or block-type connections, the neck 70 of the stem portion 28 adjacent the jam nut 34 on the side of the nearest the second connection end 32, possesses an increased length compared to the straight configuration, or is otherwise formed and adapted to incorporate the curved, angled, etc., configuration in the device 20. In these cases, the incorporation of an additional wrenching surface, e.g., a hexagonal surface 71 or other installation aides adjacent the jam nut 34 as described above and shown in FIG. 2 would generally be superfluous, as the curvature or angle of the stem portion neck 70 would serve as an effective wrench to prevent the sub-assembly from moving as the jam nut is tightened into place, and thus would likely restrict the relative slip of the components during installation. Moreover, unlike straight-configured couplings, in the case of the angled coupling as shown for example in FIG. 5, movement of the stem portion 28 relative the swivel nut 22 would not likely initiate twist in the hose to which the device is coupled, thus an additional wrenching surface may not provide a significant benefit in this configuration.

The fluid coupling of the present invention may be assembled via any suitable method. As a non-limiting example pertaining to the components described in FIG. 2, the jam nut 34 may first be threaded onto the central portion 25 of the stem portion 28, but not to its final tightened position thereon. The swivel nut 22, with internal o-ring 38 and back-up ring 42 or other sealing means already in place, may then be staked onto the stem portion 28 via conventional techniques. The hose connection end 32 may then be connected to the associated end of the hose 7 via conventional connection means as noted above. The equipment connection end 24 of the connecting end portion 22 may then be threaded or otherwise connected to the corresponding equipment port (not shown). Finally, the jam nut 34 may be tightened to its final position on the device via threading or otherwise, against the connecting end portion 22 at the central region 25 of the stem portion 28. Generally, the pre-load force exerted upon the jam nut upon installation utilizing simple hand tools, e.g., a hand wrench, is sufficient to prevent premature loosening or backing-off of the jam nut with extended pressurized operation or vibration of the device. While generally not believed to be necessary in even high pressure applications exemplified by hydraulic environments, one could optionally utilize a plastic insert as is known in the art, about the threads of at least one of the jam nut or stem portion in order to further reduce the risk of such premature loosening.

According to a preferred embodiment of the present invention, the preferred latch geometry provides the mechanism for the "swivel" or independent rotation of the hose 7 together with the stem portion 28, as the stem portion 28 is first connected to the connecting end portion 22, and the connecting end portion 22 is thereafter connected to the associated equipment port. The preferred seal geometry allows for such swivel between the stem portion 28 and connecting end portion 22 with minimal risk of damage to the internal o-ring 38. The o-ring 38 or other sealing means is further protected from wear during such installation by the maintenance of a fixed or uniform gland or aperture 40 in which it is located. The internal o-ring 38 or other sealing means is further protected from damage during installation by the preferred latch mechanism described above.

Once the jam nut 34 is tightened against the connecting end portion 22 and is in its final position, "swivel" or rotation of the stem portion 28 in relation to the connecting end portion 22 is substantially reduced or even essentially eliminated. Moreover, rocking or axial movement during pressurized operation including cyclic impulse of the system is substantially inhibited, thereby providing for dramatically improved o-ring life over existing swivel coupling designs.

The coupling of the present invention may be formed of any suitable conventional materials well known to the art, including but not limited to steel (which may or may not be plated with a material such as zinc), stainless steel and brass, but in a preferred embodiment, the stem portion, jam nut and connecting end portion are formed of zinc-plated steel. The internal sealing means (as well as any other sealing member utilized in the assembly) may be formed of any material suitable to a given application and may be properly selected by one skilled in the relevant art. Those sealing means which are in the form of elastomeric o-rings are preferably formed of a suitable elastomeric material, or combinations of materials having distinct stiffness characteristics such as, e.g., lip seals.

The dimensions of the individual components forming the coupling of the present invention may also be readily selected for a given application by one skilled in the relevant art in view of the present disclosure. Examples of components which may theoretically be modified as described herein to accommodate the incorporation of a jam nut, are set forth for example in Hydraulic Hose, Fittings & Equipment, The Gates Rubber Company, Denver Colo., 1996, the contents of which, with respect to components which may similarly be adapted for use in the practice of the present invention, are hereby incorporated by reference. The coupling of the present invention may advantageously be utilized with both wire braid hose and spiral steel wire-reinforced hose, or other conventional hose types. As well known in the art and as shown in the embodiment of FIG. 2 for example, such hose 7 may include a suitably chemical-resistant inner elastomeric layer or tube 84, a suitable wire braid or spiral steel reinforcement member 86, and a suitable outer elastomeric layer or cover 88. Suitable couplings including hydraulic couplings for use with hose having inner diameters of ¼ inch (0.63 cm) or less, ⅜ inch (0.95 cm), ½ inch (1.27 cm), ⅝ inch (1.59 cm), ¾ inch (1.90 cm) or greater, as well as for hose having inner diameters falling anywhere within these same ranges are presently contemplated, many of which have advantageously been formed in accordance with the provisions of the present invention. As a non-limiting example, the dimensions of one embodiment of the present invention, in the form of a straight-configured device (as shown, e.g., in FIG. 2) for use in medium or high pressure applications and for connection to hydraulic hose having an inner diameter of about ¼ inch (0.63 cm) and incorporating a 9/16–18 size SAE J1926 stud were as follows. The diameter of the fluid passage cavity 72 of the smaller of either the stem portion 28 or connecting end portion 22 was from about 3.9 to about 4.3 mm; the outside diameter of the stem portion 28 at the internal o-ring gland 40 was from about 6.5 to about 6.8 mm; the outside diameter of the stem portion 28 between the internal o-ring gland 40 and the collar 54 was from about 9.0 to about 9.5 mm; the outside diameter of the stem portion 28 at the collar 54 was from about 11 to about 12 mm; the outside diameter of the stem portion 28 between the collar 54 and the central region 25 was from about 8.5 to about 9.5 mm; and the length of the stem portion 28 from the terminus of its first end 30 through its connection to the jam nut 34 was from about 26 to about 30 mm.

Circumferential threads, where they occur in the coupling device of the present invention, may be of any conventional and/or suitable form, and may be sized suitably for a given application by one skilled in the art. Connection of the device to an associated hydraulic hose or other componentry may moreover be accomplished according to conventional methods. For connection to hydraulic hose for example, a ferrule 9 may be utilized as described above and shown in FIG. 2, and may or may not be crimped or swaged in place.

The coupling of the present invention may be utilized in any suitable application, but particular benefits arise from its use in medium- or high-working pressure environments, exemplified by hydraulic applications. In medium pressure environments, the latch geometry preferred in the practice of the present invention, including in particular the stabilizing apparatus, serves to restrict relative movement between the stem portion and the connecting end portion of the hydraulic coupling during assembly and installation in all directions except rotation about the device's longitudinal axis. Such a restriction allows for threading the connecting end portion into the associated equipment port without the risk of damaging the internal elastomeric seal, and virtually prevents wear or nibbling of the o-ring attributable to repeated rocking and/or swiveling during pressurized operation. It is believed that the preferred seal geometry further protects the internal o-ring by providing an aperture with essentially fixed dimensions in which the o-ring remains during pressurized operation, thus potentially eliminating the problems associated with repeated compression of the o-ring between laterally opposed o-ring gland walls. The optional but preferred incorporation of a "back-up" ring or washer essentially adjacent the o-ring seal further reduces the possibility of leakage of hydraulic fluid past the elastomeric seal by inhibiting the migration or extrusion of the elastomeric o-ring material through the close clearance that exists between the device's rigid components.

These benefits also apply to high-pressure applications. In addition however, the preferred groove and collar configuration in the latch portion of the device provides a robustness of the pertinent portion of the stem portion greatly facilitating the incorporation of a jam nut in the device which forms an essentially solid connection without the need for and concomitant costs associated with a separate adapter. Moreover, it is expected that the performance of the hydraulic coupling of the present invention would approach or exceed that of solid-type devices, without the installation problems associated therewith. Installation of the device is moreover simpler and cleaner than installation of conventional swivel couplings of the type which utilize separate adapters. The unique design of the fluid coupling of the present invention moreover lends itself to simplified installation over prior art swivel-type couplings; fewer wrenches are generally required to assemble and install the coupling assembly of the present invention. The other components forming the coupling assembly, e.g., the hose and equipment ports, need not necessarily be re-designed for use with the coupling of the present invention. Instead, the present device may be utilized with many existing, commonly utilized equipment ports.

To illustrate a chief advantage of the incorporation of a jam nut in the design of hydraulic couplings in the manner described above, two groups of couplings were subjected to an impulse test as set forth in SAE J 343, at 7200 psi (5.0×10$^7$Pa) and 250° F. (121° C.), wherein each coupling was subjected to square-wave impulse cycles at a rate of approximately 60 cycles per minute, to the earlier of a point of failure or completion of one million impulse cycles. The first group of couplings were male swivel couplings substantially as set forth above in the description of FIGS. 2 and 2B. For each of the couplings in this first group, a jam nut was threaded upon the stem portion and tightened against an opposing face on the connecting end portion. The second, comparative group of couplings was substantially the same as the first group, with the exception of the position of the jam nut which, while in place about the stem portion's central region, was not tightened to its final position in abutting relation to an opposing face on the connecting end portion. The test included either eight or sixteen couplings each at a bore size of ¼ inch (comparative couplings only), ⅜ inch, ½ inch, ⅝ inch and ¾ inch. The samples were tested on hose assemblies in accordance with SAE J343.

All of the couplings of the first group successfully withstood the million-cycle test without experiencing a single failure. For the couplings of the second group however, only the ½ inch test couplings experienced no failures. The ¼ inch comparative couplings experienced a 31% failure rate; the ⅜ inch comparative couplings experienced a 12% failure rate; the ⅝ inch comparative couplings experienced a 25% failure rate and the ¾ inch comparative couplings experienced an 87% failure rate. These larger comparative couplings moreover experienced failure at the lowest number of cycles, e.g., as low as 35,000 cycles for the ¾ inch couplings and 94,000 cycles for the ⅝ inch couplings. The ⅜ inch comparative couplings failed at as low as 499,000 cycles on test.

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element not specifically disclosed herein.

What is claimed is:

1. A swivel coupling stem portion assembly adaptable to engage a connecting end member to form a coupling for the conveyance of pressurized medium between an equipment port and a second component, the stem portion assembly comprising:

a. a stem portion having an outer surface and an inner surface;

b. a first end for engaging said connecting end member;

c. a second end defining a second coupling connection end; and d. a bore being defined by at least a portion of said inner surface;

e. and characterized in that said assembly further comprises a stabilizing apparatus for maintaining said stem portion in stabilizing relation to said connecting end member, said stabilizing apparatus being formed to reside in a position upon said coupling under pressurized operation thereof whereby independent rotation of one of said stem portion and said connecting end portion in relation to the other of said stem portion and said connecting end portion under pressurized operation conditions is substantially restricted.

2. The coupling stem portion assembly of claim 1 wherein said stabilizing apparatus is at least one of;

a. a jam nut engageable with at least one of said connecting end member and said stem portion in stabilizing relation to the other of said connecting end member and said stem portion;

b. an annular collar having a surface for engaging at least one annular groove in at least one of said connecting end member and said stem portion.

3. A swivel coupling for the conveyance of pressurized medium between an equipment port and a second component, comprising;

a. a connecting end portion having a first end defining an equipment connection end adaptable to engage said port, and a second end;

b. a stem portion having a first end for coupling engagement to said connecting end portion, and a second end defining a second coupling connection end;

c. said connecting end portion and said stem portion each possessing an outer surface and an inner surface, at least a portion of said inner surfaces forming a bore for conveyance of said medium;

and characterized in that said coupling further comprises a stabilizing apparatus for maintaining said stem portion in stabilizing relation to the connecting end portion and being formed to reside in a position upon said coupling under pressurized operation thereof whereby independent rotation of one of said stem portion and said connecting end portion in relation to the other of said stem portion and said connecting end portion under pressurized operation conditions is substantially restricted, said stabilizing apparatus being attached to said device at a point other than at said connecting end portion's equipment connection end.

4. The coupling of claim 3 wherein said stabilizing apparatus is at least one of;

a. a jam nut engageable with at least one of said connecting end member and said stem portion in stabilizing relation to the other of said connecting end member and said stem portion;

b. an annular collar having a surface for engaging at least one annular groove in at least one of said connecting end member and said stem portion.

5. The coupling of claim 3 further comprising a sealing member between said stem portion and said connecting end portion.

6. The coupling of claim 5 wherein said sealing means comprises an elastomeric o-ring.

7. The coupling of claim 6 wherein said sealing means further comprises a back-up ring adjacent said elastomeric o-ring.

8. The coupling of claim 5 wherein one of said connecting end portion and stem portion possesses an annular gland for containing said sealing means, said gland comprising two laterally opposed walls and a third wall substantially transverse to said laterally opposed walls, said gland walls being designed and adapted to surround said sealing means on three sides upon assembly of said coupling.

9. The coupling of claim 4 wherein said connecting end portion is in the form of a swivel stake nut, wherein said collar is in the form of an annular projection integral with and projecting radially from one of said swivel stake nut and said stem portion; wherein the other of said swivel stake nut and stem portion includes an annular groove for engaging said projection to form a connection between said swivel stake nut and said stem portion.

10. The coupling of claim 9 wherein said annular groove comprises two lateral walls and a third wall transverse to said lateral walls, said groove walls being designed and adapted to surround said projection on three sides upon assembly of said coupling.

11. The coupling of claim 4 wherein said connecting end portion is in the form of a push-to-connect adapter, wherein said collar is in the form of a retaining ring, wherein at least one of said push-to-connect adapter and said stem portion includes an annular groove for engaging said retaining ring to form a connection between said connecting end portion and said stem portion.

12. The coupling of claim 7 wherein said back-up ring is formed of a fluorinated polymer.

13. The coupling of claim 9 further comprising an annular chamfer adjacent said annular groove.

14. The coupling of claim 11 wherein said annular groove includes a step for urging said retaining ring into proper alignment within said coupling upon application of said stabilizing apparatus to said coupling.

15. The coupling of claim 3 wherein said outer surface of said stem portion possesses connection means at said second connection end for connection to said second component.

16. A hydraulic coupling for the conveyance of pressurized medium between an equipment port and a hydraulic hose, comprising;

a. a swivel nut having an outer surface and an inner surface, a threaded first end for connection to said port, and a second end;

b. a stem portion having an outer surface and an inner surface, a first end for rotatable engagement with said second end of said swivel nut, a second end defining a hose connection end, and a central region situated between said first end and said hose connection end; said outer surface at said hose connection end possessing connection means for connection to said hydraulic hose;

c. a flexible o-ring forming an elastomeric seal between said stem portion and said swivel nut;

d. a back-up ring formed of a fluorinated polymer adjacent said o-ring;

e. at least a portion of said inner surfaces of said stem portion and said swivel nut forming a bore for conveyance of said medium;

f. the improvement comprising; a jam nut threaded onto the central region of said stem portion, said jam nut possessing a leading end and a trailing end, said leading end possessing an annular leading face, said leading face being in substantially abutting relation to at least a portion of an opposing face on said second end of said swivel nut, said jam nut being formed to reside in a position upon said coupling under pressurized operation thereof whereby independent rotation of one of said stem portion and said swivel nut in relation to the other of said stem portion and said swivel nut under pressurized operation conditions is substantially restricted.

17. A hydraulic coupling assembly comprising the coupling of claim 3, and a hydraulic hose coupled to said second connection end of said stem portion.

* * * * *